(12) United States Patent
Lane

(10) Patent No.: US 10,471,849 B2
(45) Date of Patent: Nov. 12, 2019

(54) DC CIRCUIT BREAKER AND DISCONNECTOR

(71) Applicant: HAWKER SIDDELEY SWITCHGEAR LIMITED, Birmingham (GB)

(72) Inventor: Stephen Ernest Lane, Loughborough (GB)

(73) Assignee: Hawker Siddeley Switchgear Limited, Birmingham (GB)

( * ) Notice: Subject to any disclaimer, the term of this patent is extended or adjusted under 35 U.S.C. 154(b) by 254 days.

(21) Appl. No.: 15/524,008

(22) PCT Filed: Nov. 3, 2015

(86) PCT No.: PCT/GB2015/053304
§ 371 (c)(1),
(2) Date: May 3, 2017

(87) PCT Pub. No.: WO2016/071684
PCT Pub. Date: May 12, 2016

(65) Prior Publication Data
US 2017/0327006 A1    Nov. 16, 2017

(30) Foreign Application Priority Data

Nov. 4, 2014 (GB) .................................. 1419621.6

(51) Int. Cl.
*B60M 3/04* (2006.01)
*H01H 33/59* (2006.01)
(Continued)

(52) U.S. Cl.
CPC .............. *B60M 3/04* (2013.01); *H01H 33/52* (2013.01); *H01H 33/596* (2013.01);
(Continued)

(58) Field of Classification Search
CPC . B60M 3/00; B60M 3/02; B60M 3/04; B60M 5/00; B60M 5/02; H01H 1/12;
(Continued)

(56) References Cited

FOREIGN PATENT DOCUMENTS

CN    101145677    3/2008
CN    102347153    2/2012
(Continued)

OTHER PUBLICATIONS

Search Report Under Section 17; GB 1419621.6; dated May 22, 2015.
(Continued)

*Primary Examiner* — Robert J McCarry, Jr.
(74) *Attorney, Agent, or Firm* — DeWitt LLP; Thomas J. Nikolai

(57) ABSTRACT

A circuit breaker/disconnector apparatus for use in a power delivery system comprises a unidirectional DC circuit breaker which has a first terminal and a second terminal and is configured to automatically open during an overcurrent condition in a forward direction and to remain closed independent of current level in a reverse direction. A disconnector switch is in series with the circuit breaker. The disconnector switch has a first terminal for connecting to a first polarity connector of a power supply, a second terminal for connecting to a second polarity connector of the power supply and a common terminal connected to the first terminal of the circuit breaker. The disconnector switch has at least a first position in which the first terminal is connected to the common terminal and a second position in which the second terminal is connected to the common terminal. The second polarity connector of the power supply may be coupled to a track of a transport system and the second polarity connector of the power supply may be coupled to a live overhead cable or live third rail of a transport system. The apparatus can be used to safely ground the live cable or third rail when in a maintenance condition.

16 Claims, 1 Drawing Sheet

(51) Int. Cl.
  *H01H 33/52* (2006.01)
  *H01H 71/12* (2006.01)
  *H01H 31/00* (2006.01)
  *H01H 33/12* (2006.01)
  *H02H 3/087* (2006.01)

(52) U.S. Cl.
  CPC ......... *H01H 71/128* (2013.01); *H01H 31/003* (2013.01); *H01H 33/125* (2013.01); *H02H 3/087* (2013.01)

(58) Field of Classification Search
  CPC .. H01H 1/20; H01H 1/58; H01H 9/20; H01H 9/22; H01H 33/00
  See application file for complete search history.

(56) References Cited

FOREIGN PATENT DOCUMENTS

| | | |
|---|---|---|
| CN | 203445606 | 2/2014 |
| CN | 103692929 | 4/2014 |
| GB | 2100209 | 12/1982 |
| GB | 2357271 | 6/2001 |
| JP | 2005-190671 | * 7/2005 ............ H01H 33/59 |
| TW | 470977 | 1/2002 |
| TW | 1617106 | 3/2018 |
| WO | WO2016071684 | 5/2016 |

OTHER PUBLICATIONS

International Preliminary Report; PCT/GB2015/053304; dated May 9, 2017.
Office Action for Serial No. 104136305.
Response to the Written Opinion of the International Preliminary Report on Patentability dated May 9, 2017 with annotated claims.
Response to the first Taiwanese Office Action for Taiwanese application TW104136305 dated Aug. 23, 2017.
First Chinese Office Action and Translation; Response to First Chinese Office Action and Translated Amended Claims; European Intention to Grant, pp. 1-24.
Chile: Office action 1.
Chile: Office action 2.
Australian: Office action 1.

* cited by examiner

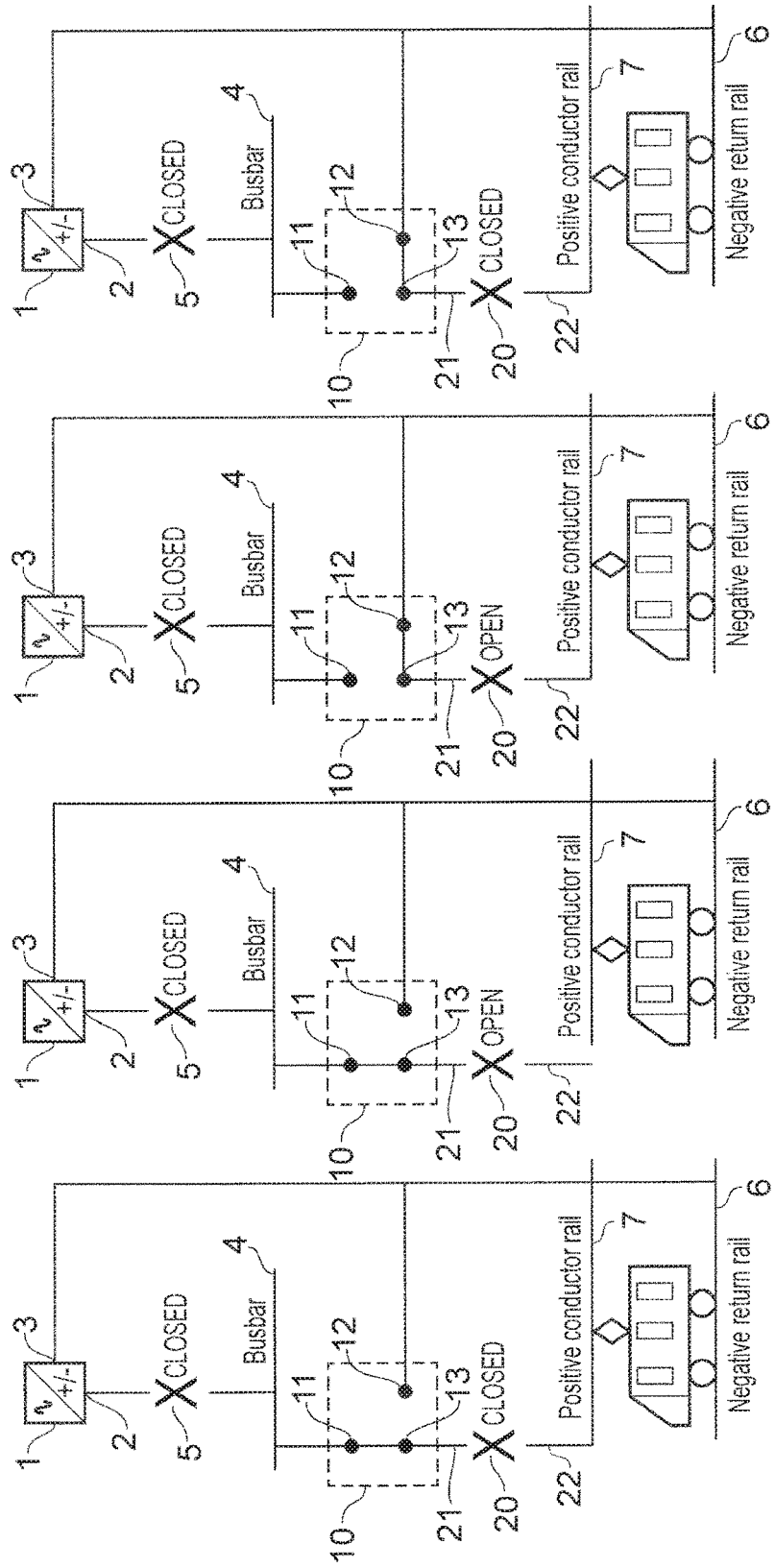

DC CIRCUIT BREAKER AND DISCONNECTOR

CROSS-REFERENCED TO RELATED APPLICATIONS

This application claims priority from Application PCT/GB2015/053304, filed Nov. 3, 2015 which is deemed incorporated by reference in its entirety in this application.

STATEMENT REGARDING FEDERALLY SPONSORED RESEARCH OR DEVELOPMENT

Not applicable.

BACKGROUND OF THE INVENTION

I. Field of the Invention

The present invention relates to circuit breakers and in particular to direct current circuit breakers.

II. Discussion of the Prior Art

Direct current power delivery systems are in widespread use, e.g. in delivering power to conductor rails of transport systems. Examples include railway and tramway infrastructure, where DC current is supplied to a live, e.g. positive voltage, conductor rail such as a live third rail track or a live overhead cable. Such power delivery systems require automatic circuit breaker protection to quickly and automatically disconnect the live conductor rail from a power supply in the event of an overcurrent status. Such overcurrents may be caused by numerous types of event such as damage to a cable support structure, dislodgement of a cable or rail, accidental shorting of a live conductor rail to ground, or overload condition in a load device using the power delivery system.

The power delivery systems also require a mechanism for placing the conductor rail in a safe, e.g. grounded, maintenance condition when it is necessary for personnel to work on the infrastructure. This is so that any inadvertent connection of the conductor rail to a source of power, or a lightning strike on the conductor rail somewhere in the network, does not cause damage or harm to other parts of the infrastructure or to personnel working on the infrastructure while the live conductor rail is out of service.

In existing infrastructure, one approach to providing a safe maintenance condition of the conductor rail is to manually attach a shorting bar or clamp between the conductor rail and a negative voltage return rail or a grounded rail.

SUMMARY OF THE INVENTION

It is an object of the invention to provide an alternative and/or improved apparatus for enabling functionality of both (i) automatic circuit breaker protection and (ii) grounding of a conductor rail to a 'maintenance' or 'out-of-service' condition.

According to one aspect, the present invention provides a circuit breaker/disconnector apparatus for use in a power delivery system comprising:

a unidirectional DC circuit breaker having a first terminal and a second terminal and configured to automatically open during an overcurrent condition in a forward direction and to remain closed independent of current level in a reverse direction;

a disconnector switch in series with the circuit breaker, the disconnector switch having a first terminal for connecting to a first polarity connector of a power supply, a second terminal for connecting to a second polarity connector of the power supply and a common terminal connected to the first terminal of the circuit breaker;

the disconnector switch having at least a first position in which the first terminal is connected to the common terminal and a second position in which the second terminal is connected to the common terminal.

The circuit breaker may include a manually operable trip switch configured to force the circuit breaker into an open condition. The disconnector switch may be interlocked to prevent switching between the first and second positions while the circuit breaker is in a closed condition. The second terminal of the circuit breaker may be coupled to a first conductor rail of a power delivery system. The first terminal of the disconnector switch may be connected to a first polarity connector of the power supply and the second terminal of the disconnector switch may be connected to a second polarity connector of the power supply. The second polarity connector of the power supply may be coupled to a track of a transport system and the first polarity connector of the power supply may be coupled to an overhead cable or third rail of a transport system. The forward direction may correspond to current flow from the first terminal to the second terminal of the circuit breaker and the reverse direction may correspond to current flow from the second terminal to the first terminal of the circuit breaker. The disconnector switch may include a third position in which both the first and second terminals are electrically isolated from the common terminal. The disconnector switch may be configured to be operated by manual operation. The disconnector switch may include a visual position indicator indicating its status in the first or second position.

According to another aspect, the invention provides a method of configuring a power delivery system comprising:

providing a DC power supply having a first polarity terminal and a second polarity terminal;

coupling a disconnector switch to the DC power supply, such that the disconnector switch has a first terminal connected to the first polarity terminal of the DC power supply and a second terminal connected to the second polarity terminal of the power supply, the disconnector switch having at least a first position in which the first terminal is connected to a common terminal and a second position in which the second terminal is connected to the common terminal;

connecting the common terminal of the disconnector switch to a first terminal of a unidirectional DC circuit breaker having a first terminal and a second terminal and configured to automatically open during an overcurrent condition in a forward direction and to remain closed independent of current level in a reverse direction;

connecting the second terminal of the circuit breaker to a first power line; and connecting the second terminal of the disconnector switch and the second polarity terminal of the DC power supply to a second power line.

The method may include placing the first and second power lines in an in-service condition by switching the disconnector switch to the first position and then setting the circuit breaker to a closed configuration. The method may include placing the first and second power lines in a safe maintenance condition by setting the circuit breaker to an open configuration, then switching the disconnector switch to the second position, then setting the circuit breaker to a closed configuration.

Embodiments of the present invention will now be described by way of example and with reference to the accompanying drawings in which:

DESCRIPTION OF THE DRAWINGS

FIGS. 1A to 1D are schematic diagrams showing a power delivery system for a railway infrastructure in four states illustrating the switching of the conductor rails of the railway from a service (powered) condition to a safe maintenance condition.

DETAILED DESCRIPTION

FIG. 1 shows a schematic representation of a high voltage power delivery system for delivering power to the conductor rails of a railway infrastructure. A DC power supply 1 has a positive output terminal 2 and a negative output terminal 3. The DC power supply 1 may be a rectifier receiving an AC input. The positive output terminal 2 is connected to a busbar 4 via a circuit breaker 5. The bus bar 4 is connected to a disconnector switch 10 which is connected to a unidirectional circuit breaker 20. The negative output terminal 3 of the power supply 1 is connected to a negative return conductor rail 6 of the railway infrastructure. The circuit breaker 20 is connected to a positive conductor rail 7 of the railway infrastructure.

In one configuration, the positive conductor rail 7 may be an overhead cable or catenary suitable for current collection by a pantograph. In another configuration, the positive conductor rail may be a live third rail, e.g. a rigid conductor placed alongside or between the rails of a railway track. The negative return conductor rail 6 may be a railway track or tram track.

The disconnector switch 10 has a first terminal 11 which is electrically connected to the busbar 4 and, thereby, to the positive output terminal 2 of the power supply 1. The disconnector switch 10 has a second terminal 12 which is electrically connected to the negative output terminal 3 of the power supply 1 and to the negative return conductor rail 6. The disconnector switch 10 has a third terminal which may be described as a common terminal 13 which is connected to a first terminal 21 of the unidirectional circuit breaker 20. The disconnector switch 10 has a first position in which its first terminal 11 is electrically connected to the common terminal 13, and a second position in which its second terminal 12 is connected to the common terminal 13, e.g. a single pole, two position configuration.

The circuit breaker 20 has a first terminal 21 and a second terminal 22 and is unidirectional in the sense that it is configured to automatically open contacts of the circuit breaker upon detection of an overcurrent condition in a first (forward) direction, in this instance for current flowing from the first terminal 21 to the second terminal 22, whereas it does not automatically open contacts of the circuit breaker in the event of current flow or overcurrent flow in the reverse direction, i.e. current flowing from the second terminal 22 to the first terminal 21.

The busbar 4 may feed other disconnector and circuit breaker apparatus not shown in the drawings, e.g. those configured to feed other segments of the conductor rails 6, 7, of the railway infrastructure.

In use, the power delivery system would be in a normal service condition as shown in FIG. 1A in which power is delivered from the power supply 1 to the rails 6 and 7 by the circuit breaker 5 being closed (as labelled), the disconnector switch 10 being in the first position as shown (terminals 11 and 13 connected) and the circuit breaker 20 being closed (as labelled).

To bring the power delivery system into a safe condition for maintenance, not only must the connection between the busbar 4 and the positive conductor rail 7 be broken, but also the positive and negative rails 6, 7 must be shorted together.

In a first step, as shown in FIG. 1B, the circuit breaker 20 is set to an open condition, e.g. by intentionally tripping the circuit breaker with a manual override or electronic actuation, or by an actual overcurrent fault condition which caused the circuit breaker to open automatically. It can be seen that the disconnector switch 10 is now off-load and can be safely switched to the second position (terminals 12 and 13 connected) as indicated in FIG. 1C.

In FIG. 1C, the disconnector switch 10 is now in the second position connecting the second terminal 12 to the common terminal 13, and thus the negative conductor rail 6 and negative terminal 3 of the power supply 1 are coupled to the circuit breaker first terminal 21. At this time, the circuit breaker 20 is reset or otherwise made to close the circuit breaker contacts and effectively short together the positive conductor rail 7 and the negative conductor rail 6, leaving the conductor rail 7 in a safe condition for maintenance etc, as shown in FIG. 1D.

The unidirectionality of the circuit breaker 20 thereby now ensures that, in the configuration of FIG. 1D, an inadvertent or accidental connection of the rail 7 to a power supply or its exposure to an electrical discharge such as a lightning strike will not trip the circuit breaker to an open condition which would leave the conductor rail 7 potentially live and unsafe. Instead, the circuit breaker will remain closed and will allow the current to flow to ground via the negative return rail 6.

To reconnect the power delivery system to an in-service condition, the steps discussed above are reversed.

The configuration of power delivery system described herein offers an advantage in that the apparatus for both circuit breaking function and grounding can be integrated into a common apparatus comprising an off-load disconnector and a circuit breaker, and the circuit breaker can be used to place the disconnector into an off-load condition for both connection and disconnection.

Another possible advantage is that by addition of a simple changeover off-load disconnector 10 into the circuit, an already-present fully rated circuit breaker 20 can be used to achieve the fault-make, (load-break, if necessary) and short-time current duty requirements of an earthing device, whilst still providing forward protection and switching functions. A circuit breaker 20 is generally a much more robust device than a conventional earthing switch due to its extended range of operating duties often required by international standards.

Another potential advantage is that the disconnector 10 only need be capable of withstanding the passage of current (short term withstand current or STC rating) and is more compact than a comparable fault-make, STC (and load-break) rated switching device and can be installed in the rear of a circuit breaker cubicle without needing a separate panel or external cabling. Thus, manufacturer and user costs can be saved.

The disconnector may generally be a simpler and more reliable device than a comparable switching device and can be rated for an extended number of mechanical operations without maintenance. Because it can be operated only as an off-load device, the disconnector 10 need not suffer arcing across any contacts and is therefore not prone to wear and requires minimal maintenance.

Various modifications may be made to the configuration shown in FIG. 1. In the arrangement shown, the positive terminal 2 of the power supply 1 has a first polarity and is connected to the disconnector switch 10, circuit breaker 20 and "live" conductor rail 7, while the negative terminal 3 has a second polarity and is connected to a "safe" negative return rail 6 which is generally held at or close to ground potential. It will be recognised that this could be reversed with a positive terminal 2 of the power supply being connected as a "safe" potential at or near ground potential and the negative terminal 3 providing power to the "live" conductor rail 7. In this respect, the first and second polarities of the power supply terminals can be reversed.

The disconnector switch 10 may also be provided with a third, stable, position (not shown in the figures) corresponding to an intermediate or "isolation" position in which neither the first terminal 11 nor the second terminal 12 is electrically connected to the common terminal 13, such that both the first and second terminals 11, 12 are electrically isolated from the common terminal 13. In this way, the conductor rail 7 can be completely isolated from the positive and negative output terminals 2, 3 of the power supply 1.

The disconnector switch 10 may be configured to operate entirely manually, or with automatic actuation or with a combination of both. The disconnector switch may include an emergency manual operation facility.

The disconnector switch 10 may include a visual position indicator indicating its status in any of the first, second and/or third positions. The visual position indicator could be provided by a driven indicator semaphore, or a window giving sight of the relevant moving parts. Other types of visual position indicator are possible.

The circuit breaker 20 can be configured to trip in the forward direction at any suitable current level considered as an overcurrent condition.

The circuit breaker 20 may comprise any device or assembly or other suitable arrangement for providing a means of breaking the circuit upon detection of an overcurrent condition in a forward direction and to remain closed independent of current level in a reverse direction. For example, a circuit breaker as defined could comprise a switch or circuit breaking device that can be triggered with a protection relay via a shunt trip coil. The switch or circuit breaking device could be triggered by any suitable separate mechanism for detecting the appropriate fault or overload condition.

The power delivery system has been described in the context of a power delivery system for delivering power to the conductor rails 6, 7 of a railway or tramway infrastructure. However, it can be applied more generally to any power delivery system in which conductor network normally at a live high potential must be grounded or shorted to a conductor at a safe potential when in a maintenance or out-of-service condition.

The power delivery system may be modified to include an interlock system which prevents the disconnector switch 10 from being operated in one or both directions when the circuit breaker 20 is in the closed condition. If the disconnector switch 10 is provided with a third ('isolation') position as discussed above, the interlock system may be configured to prevent the disconnector switch from being operated to transition from or to any one or more of the first, second and third positions.

Other embodiments are intentionally within the scope of the accompanying claims.

The invention claimed is:

1. An apparatus for use in a power delivery system comprising:
   a unidirectional DC circuit breaker having a first terminal and a second terminal and configured to automatically open during an overcurrent condition in a forward direction and to remain closed independent of current level in a reverse direction;
   a disconnector switch in series with the circuit breaker, the disconnector switch having a first terminal for connecting to a first polarity connector of a power supply, a second terminal for connecting to a second polarity connector of the power supply and a common terminal connected to the first terminal of the circuit breaker;
   the disconnector switch having at least a first position in which the first terminal is connected to the common terminal and a second position in which the second terminal is connected to the common terminal.

2. The apparatus of claim 1 in which the circuit breaker includes a manually operable trip switch configured to force the circuit breaker into an open condition.

3. The apparatus of claim 1 in which the disconnector switch is interlocked to prevent switching between the first and second positions while the circuit breaker is in a closed condition.

4. The apparatus of claim 1 in which the second terminal of the circuit breaker is coupled to a first conductor rail of a power delivery system.

5. The apparatus of claim 4 in which the first terminal of the disconnector switch is connected to a first polarity connector of the power supply and the second terminal of the disconnector switch is connected to a second polarity connector of the power supply.

6. The apparatus of claim 5 which the second polarity connector of the power supply is coupled to a track of a transport system and in which the first polarity connector of the power supply is coupled to an overhead cable or third rail of a transport system.

7. The apparatus of claim 1 in which the first terminal of the disconnector switch is connected to a first polarity connector of the power supply and the second terminal of the disconnector switch is connected to a second polarity connector of the power supply.

8. The apparatus of claim 7 in which the second polarity connector of the power supply is coupled to a track of a transport system and in which the first polarity connector of the power supply is coupled to an overhead cable or third rail of a transport system.

9. The apparatus of claim 1 in which the forward direction corresponds to current flow from the first terminal to the second terminal of the circuit breaker and the reverse direction corresponds to current flow from the second terminal to the first terminal of the circuit breaker.

10. The apparatus of claim 1 in which the disconnector switch includes a third position in which both the first and second terminals are electrically isolated from the common terminal.

11. The apparatus of claim 1 in which the disconnector switch is configured to be operated by manual operation.

12. The apparatus of claim 1 in which the disconnector switch includes a visual position indicator indicating its status in the first or second position.

13. A method of configuring a power delivery system comprising:
  providing a DC power supply having a first polarity terminal and a second polarity terminal;
  coupling a disconnector switch to the DC power supply, such that the disconnector switch has a first terminal connected to the first polarity terminal of the DC power supply and a second terminal connected to the second polarity terminal of the power supply, the disconnector switch having at least a first position in which the first terminal is connected to a common terminal and a second position in which the second terminal is connected to the common terminal;
  connecting the common terminal of the disconnector switch to a first terminal of a unidirectional DC circuit breaker having a first terminal and a second terminal and configured to automatically open during an overcurrent condition in a forward direction and to remain closed independent of current level in a reverse direction;
  connecting the second terminal of the circuit breaker to a first power line; and
  connecting the second terminal of the disconnector switch and the second polarity terminal of the DC power supply to a second power line.

14. The method of claim 13 further including the step of placing the first and second power lines in an in-service condition by switching the disconnector switch to the first position and then setting the circuit breaker to a closed configuration.

15. The method of claim 14 further including the step of placing the first and second power line in a safe maintenance condition by setting the circuit breaker to an open configuration, then switching the disconnector switch to the second position, then setting the circuit breaker to a closed configuration.

16. The method of claim 13 further including the step of placing the first and second power lines in a safe maintenance condition by setting the circuit breaker to an open configuration, then switching the disconnector switch to the second position, then setting the circuit breaker to a closed configuration.

* * * * *